(12) United States Patent
Haerle et al.

(10) Patent No.: US 8,894,236 B2
(45) Date of Patent: Nov. 25, 2014

(54) LIGHTING DEVICE HAVING A PLURALITY OF LIGHT SOURCES AND A REFLECTION ARRANGEMENT AND REFLECTOR UNIT

(75) Inventors: Kaspar Haerle, Ehingen (DE); Izet Nokic, Ehingen-Altbierlingen (DE)

(73) Assignee: Ultralite Deutschland Haerle Lichttechnik GmbH, Ehingen (DE)

( * ) Notice: Subject to any disclaimer, the term of this patent is extended or adjusted under 35 U.S.C. 154(b) by 113 days.

(21) Appl. No.: 13/138,346

(22) PCT Filed: Feb. 3, 2010

(86) PCT No.: PCT/EP2010/000660
§ 371 (c)(1),
(2), (4) Date: Aug. 4, 2011

(87) PCT Pub. No.: WO2010/089100
PCT Pub. Date: Aug. 12, 2010

(65) Prior Publication Data
US 2011/0292654 A1     Dec. 1, 2011

(30) Foreign Application Priority Data

Feb. 5, 2009 (DE) .......................... 10 2009 007 647

(51) Int. Cl.
| | |
|---|---|
| *F21V 7/09* | (2006.01) |
| *F21K 99/00* | (2010.01) |
| *F21V 7/04* | (2006.01) |
| *F21V 7/00* | (2006.01) |
| *G02B 19/00* | (2006.01) |
| *G03B 21/20* | (2006.01) |
| *F21W 131/406* | (2006.01) |
| *F21Y 101/02* | (2006.01) |
| *F21Y 103/02* | (2006.01) |

(52) U.S. Cl.
CPC . *F21K 9/00* (2013.01); *F21V 7/041* (2013.01); *F21V 7/0083* (2013.01); *F21V 7/0066* (2013.01); *F21V 7/0025* (2013.01); *F21W 2131/406* (2013.01); *F21Y 2101/02* (2013.01); *F21Y 2103/022* (2013.01); *G02B 19/0066* (2013.01); *G02B 19/0019* (2013.01); *G03B 21/2033* (2013.01); *G03B 21/2066* (2013.01)
USPC ............ 362/247; 362/235; 362/302; 362/305

(58) Field of Classification Search
CPC . F21Y 2103/022; F21Y 2101/02; F21K 9/00; F21V 7/0008; F21V 7/0025; F21V 7/041; F21V 7/0066; F21V 7/0083; F21V 7/0033
USPC ......... 362/241, 247, 302, 304, 305, 235, 216, 362/298
See application file for complete search history.

(56) References Cited

U.S. PATENT DOCUMENTS

| 1,545,711 A * | 7/1925 | Townsend ..................... 362/305 |
| 6,238,073 B1 * | 5/2001 | Ito et al. ......................... 362/544 |

(Continued)

FOREIGN PATENT DOCUMENTS

| DE | 199 20 404 A1 | 11/2000 |
| DE | 20 2004 002 274 U1 | 5/2004 |

(Continued)

*Primary Examiner* — Alan Cariaso
(74) *Attorney, Agent, or Firm* — Breneman & Georges

(57) ABSTRACT

The invention relates to a reflector unit and a lighting device (1) having a plurality of light sources (4) and a reflection arrangement, with the light sources (4) being positioned in front of a reflection surface of the reflection arrangement, with the light beam from the light sources (4) being deflected by reflection to the main emission direction of the lighting device (1) via the reflection arrangement. According to the invention, a first reflection section (2) and a raised second reflection section (5) are provided, with the first and the second reflection sections being matched to one another such that a main light beam can be produced, in that the light from the light sources (4) first of all strikes the second reflection section (5), and then the first reflection section (2), and leaves the lighting device in the main emission direction.

14 Claims, 2 Drawing Sheets

(56) References Cited

U.S. PATENT DOCUMENTS

| | | |
|---|---|---|
| 6,356,390 B1 | 3/2002 | Hall, Jr. |
| 6,722,777 B2 * | 4/2004 | Erber ............................ 362/518 |
| 6,830,359 B2 * | 12/2004 | Fleury ........................... 362/237 |
| 6,851,835 B2 * | 2/2005 | Smith et al. ................... 362/305 |
| 8,104,923 B2 * | 1/2012 | Nagai ............................ 362/240 |
| 8,608,339 B2 * | 12/2013 | Gerli et al. .................... 362/235 |
| 2002/0114158 A1 * | 8/2002 | Chuang ......................... 362/243 |
| 2005/0146890 A1 * | 7/2005 | Wu ................................ 362/545 |

FOREIGN PATENT DOCUMENTS

| | | |
|---|---|---|
| DE | 10 2006 048 571 A1 | 4/2008 |
| DE | 10 2007 058 173 A1 | 6/2009 |
| EP | 1 300 626 A2 | 4/2003 |
| GB | 193439 | 2/1923 |
| WO | WO 2008/089324 A2 | 7/2008 |
| WO | WO 2008/148423 A1 | 12/2008 |

* cited by examiner

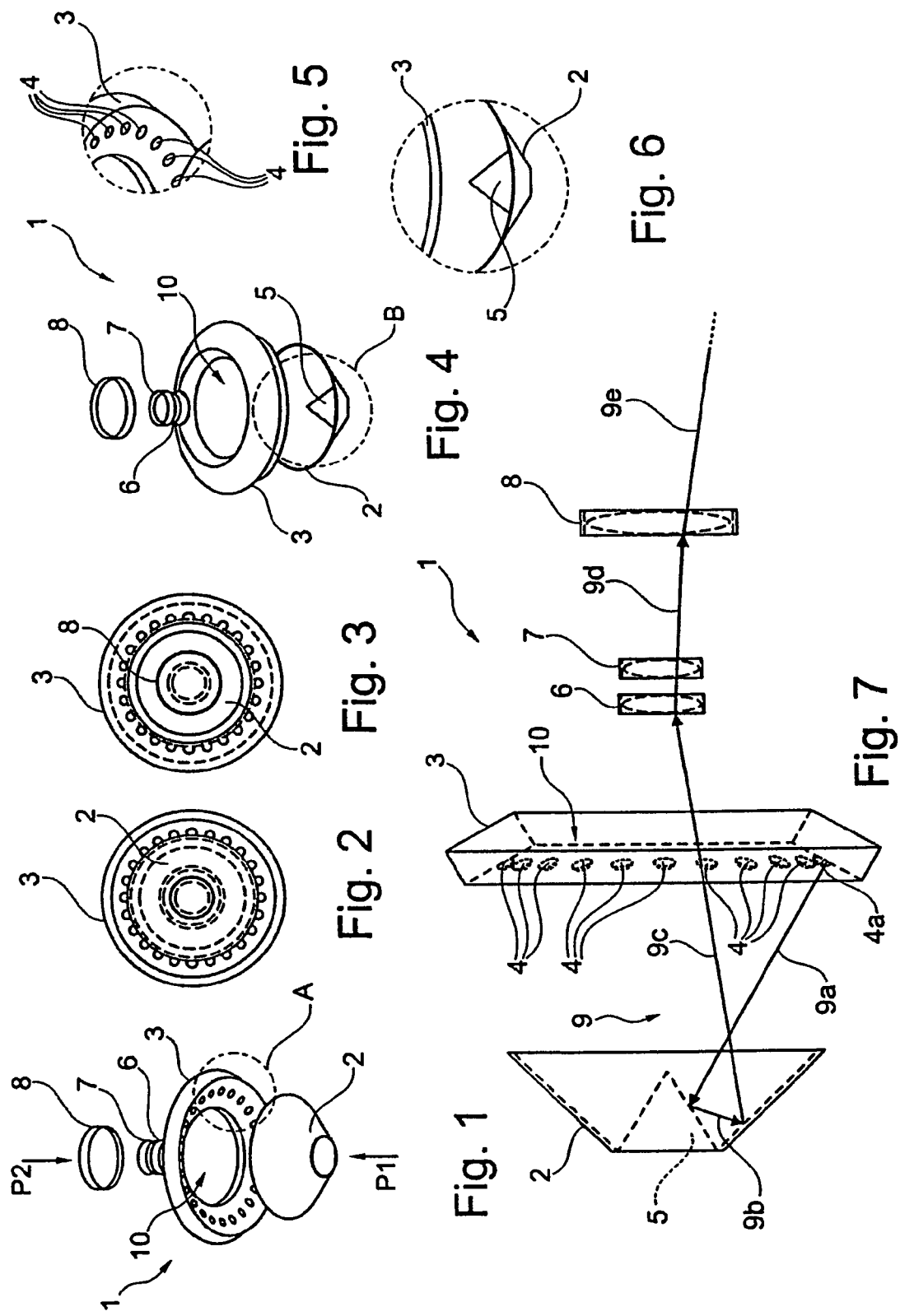

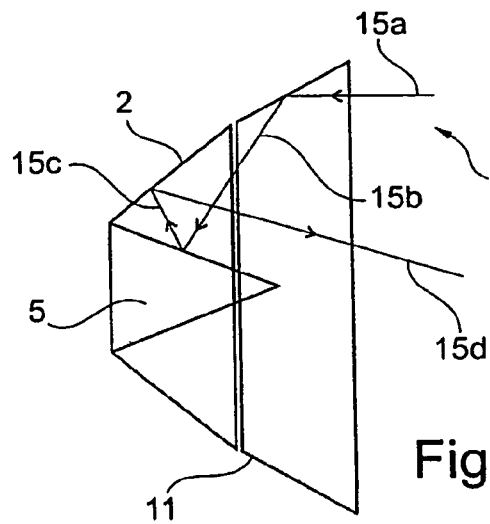
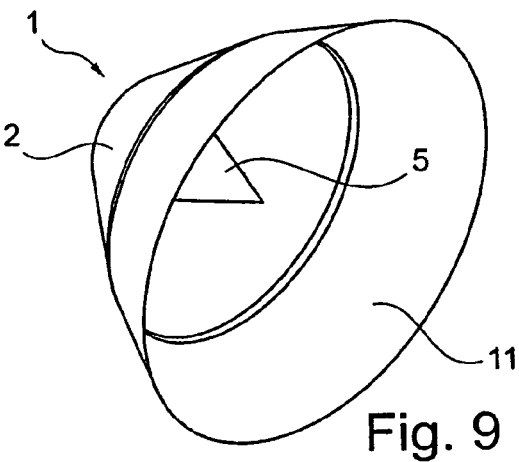
Fig. 8
Fig. 9
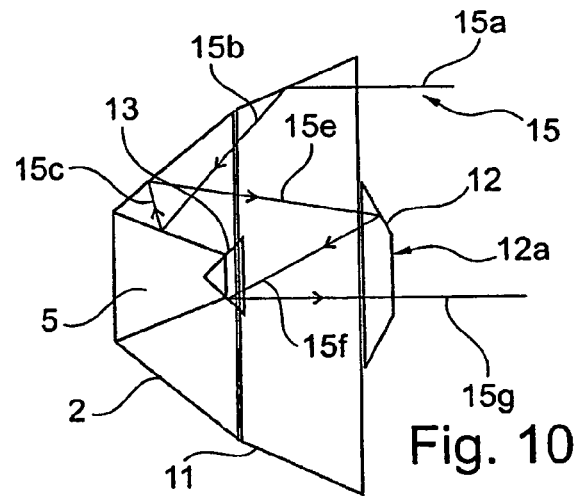
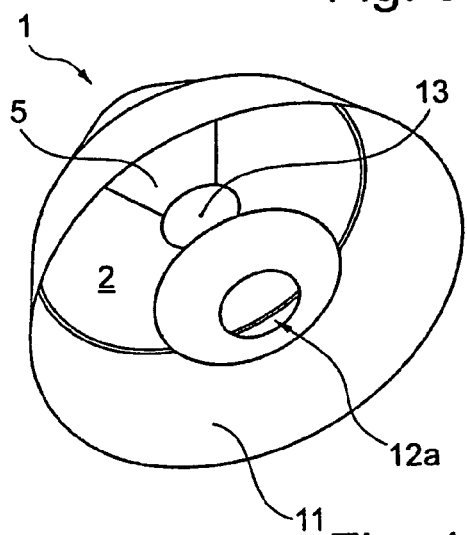
Fig. 10
Fig. 11
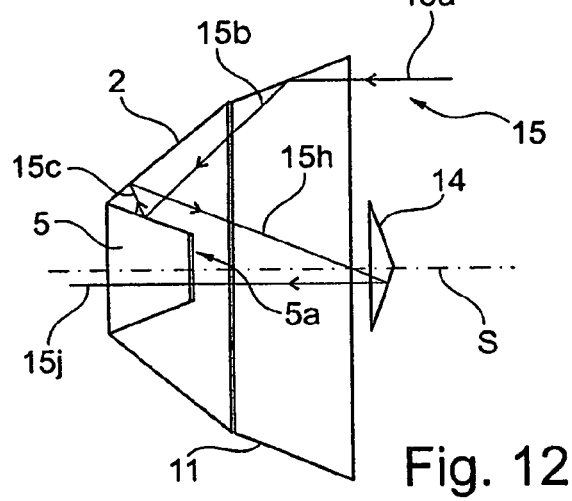
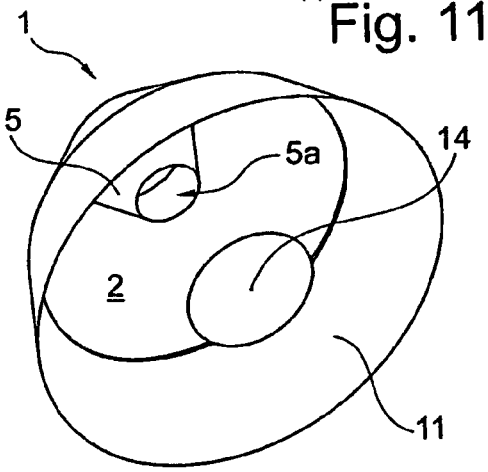
Fig. 12
Fig. 13

LIGHTING DEVICE HAVING A PLURALITY OF LIGHT SOURCES AND A REFLECTION ARRANGEMENT AND REFLECTOR UNIT

PRIOR ART

Lights having a plurality of artificial light sources are suitable for various purposes, for example depending on the nature of the light sources used. The use of lights having, for example, light-emitting diodes (LEDs) or LED light sources is restricted, because of the comparatively low power of the light-emitting diodes, to applications which do not need to produce high or very high light power levels. Lights having low-power light sources are used, for example, for background lighting, LED walls, flash lamps, cycle lamps or reading lights, as well as decorative light emitters, in particular when a small number of LED light sources are provided therein. In general, these lights have a light-reflecting device or a reflection arrangement.

Furthermore, lights in the form of light emitters are known, which have a plurality of LED light sources which are arranged in particular on a plane. Flat light emitters such as these illuminate, for example, an area directly and/or can in some cases also change their color, with an area light being produced without any clearly defined edges.

OBJECT AND ADVANTAGES OF THE INVENTION

The object of the present invention is to improve a lighting device having a plurality of light sources and a reflection arrangement, such that the performance characteristic of the lighting device is improved.

This object is achieved by claims 1, 2 and 15.

Advantageous developments of the invention are specified in the dependent claims.

The invention is based on a lighting device having a plurality of light sources and a reflection arrangement, with the light sources being positioned in front of a reflection surface of the reflection arrangement, with an emission direction of a light beam from the light sources running in the opposite direction to a main emission direction of the lighting device and with the light beam from the light sources being deflected by reflection to the main emission direction of the lighting device via the reflection arrangement.

The essence of the invention is that a first reflection section is provided and in that a raised second reflection section is provided, which is internal with respect to the first reflection section and is at least partially surrounded by the first reflection section, with the first and the second reflection sections being matched to one another such that a main light beam can be produced, in that light from the light sources first of all strikes the raised second conical or essentially conical reflection section and is reflected from there onto the first reflection section and, after renewed reflection, leaves the reflection arrangement in the main emission direction. A lighting device having a plurality of light sources is therefore provided, which produces a comparatively high power level. In particular, the choice of the nature of the light sources is not restricted to individual light sources or a few of them, but it is possible to use virtually all known and different forms of light sources in the lighting device. In particular, a lighting device according to the invention can achieve the effect of a high-power light without any problems, even if light sources are integrated which have poor characteristics in terms of the light that is produced having a high emission power. The range of the light sources which can advantageously be used for the proposed high-power lights is therefore widened enormously. In particular, it is now advantageously possible to use light sources from very high light power levels, which has previously been impossible because of the comparatively unsatisfactory emission power. These light sources furthermore make it possible to utilize other positive effects of the relevant light sources, which until now it has not been possible to exploit for the said reasons, with financial and/or technical aspects playing a role. A particularly high improvement potential can therefore be achieved overall.

It is particularly advantageous in this case that light sources which emit with a fuzzy edge area or do not have a defined light beam edge now, according to the invention, themselves allow a light beam to be produced with a sharp edge, and with a focused nature. In particular, a high-power light source is provided having an emission characteristic which is distinguished by the high-power beam that is produced extending to an edge boundary.

The lighting device according to the invention provides a light source which is distinguished by high light intensities. The reflection system mixes the beams from each light source and focuses the beams to give the impression of a single conventional light source.

All or virtually all of the radiation coming from the light sources is passed through the raised second reflection layer and is thus deflected onto the first reflection section, such that a very high light beam power is possible with a directional light beam, which is produced in the main emission direction. In this case, no components, or only very minor components, of the light beams leave the lighting device in a beam direction other than the main emission direction.

The second reflection section particularly advantageously has a depth or a raised size of about 40% to 80% of the total depth of the first reflection section. The total depth of the first reflection section can be determined, for example, by its size in the main emission direction, which results from a front edge of the first reflection section to a point which is furthest away therefrom on the basis of the first reflection section. In special embodiments of the lighting device, the second reflection section may have a depth or a raised size from a minimum of about 10% to a maximum of about 150% of the total depth of the first reflection section.

The lighting device according to the invention creates the preconditions to allow it to be used, for example, for high-power head spotlights in the fields of film, television, theater, stadium lighting etc. and to be used for film, video, slide projectors, light emitters for outdoor lighting systems, as well as automobile headlights and aircraft landing lights. In this case, auxiliary devices can additionally be provided in order to optically influence the light beam that can be produced, and these will be explained further below.

The first reflection section is preferably conical or has straight (in section) flanks, in particular having a truncated conical or polygonal cross section aligned in the opposite form to the conical shape of the second reflection section. Starting from a conical body, the geometric shape of the first and second reflection sections with respect to one another can be understood to be in the form of a mirror image of the cone apex or of a section with a capped cone apex, on a cross-sectional surface or by folding the apex or the truncated apex through 180 angular degrees.

The invention furthermore relates to a lighting device having a plurality of light sources and a reflection arrangement, with the light sources being positioned in front of a reflection surface of the reflection arrangement, with an emission direction of a light beam from the light sources running in the opposite direction to or in the direction of a main emission direction of the lighting device and with the light beam from the light sources being deflected by reflection to the main emission direction of the lighting device via the reflection arrangement. A further essential aspect of the invention is that a first reflection section is provided and in that a raised second reflection section is provided, which is internal with respect to the first reflection section and is at least partially surrounded by the first reflection section, with the first and second reflection sections being matched to one another such that a main light beam can be produced, in that light from the light sources strikes the raised second reflection section after reflection, and is reflected from there onto the first reflection section, and is emitted from there after reflection thereon. In particular, the raised second reflection section is conical, with a round or polygonal cross-sectional shape. For example, it may be conical or in the form of a truncated cone. In this case, the flanks which are inclined conically from the section of the second reflection section are straight, which assists the non-divergent light beam formation. If non-conical flanks, or flanks which were not at least substantially conical, were to be provided for the second reflection section, but, for example, flanks with a bent or curved section, these would actually counteract the desired effect of producing a focused light beam with sharp edges.

The light beam that is produced can suddenly provide high brightness for dark surrounding areas. In particular, scattering losses are minimized, as a result of which a bright light spot is produced. In this case, the light beams which emerge from the lighting device are aligned predominantly parallel. The reflection arrangement also allows beam formation, or focusing of the light. Furthermore, optical elements such as lenses and/or light guides can be provided to form the desired light beam characteristic. In addition, the lighting device according to the invention is physically compact.

According to one variant relating to the case according to the invention, in which the light coming from the first reflection section leaves the lighting device without further reflection, it is proposed that light coming from the first reflection section leaves the reflection arrangement in the main emission direction after a further reflection. In particular, this accordingly allows deflection, or deflection away, as a result of which an emission direction of a light beam from the light sources runs in the direction of the main beam direction of the lighting device. In particular, the further reflection can take place via an opposing reflection section, which is arranged concentrically with respect to the optical axis or longitudinal axis of the lighting device. The opposing reflection section may, for example, be in the form of a shell or funnel. Alternatively, the opposing reflection section may be formed on the basis of this shape, without a funnel tip, or in the form of a conical ring, or may have an opening which is concentric with respect to the virtual funnel tip. This opening may be used as a light outlet opening for light from the reflection arrangement, for example light emerging from the opposing reflection section is once again reflected, and then passes through the opening.

In principle, the lighting device or its components, may be designed to be rotationally symmetrical with the components having an external shape with a round cross section. However, the lighting device may also be designed with a closed polygonal cross-sectional shape, or with a polygonal external shape. This makes it possible to produce an essentially conical internal reflector. The reflection sections, such as the inner and outer reflector, may then have individual reflection surfaces which correspond to one another, that is to say in each case one reflection surface of the outer reflector, together with a reflection surface on the inner reflector, reflects the light beams toward one another. A reflection surface under consideration of the inner reflector can then in each case be associated with an associated reflection surface on the outer reflector, with the relevant light beams running between these sections.

The light sources advantageously comprise a plurality of lighting means, which are arranged around an outlet opening in the reflection arrangement. This allows the lighting device to be designed in a space-saving manner. This also very effectively makes it possible for virtually all of the emitted light from each light source or each lighting means to strike the second reflection section directly, that is to say without intermediate reflection. Furthermore, an individual light source and/or a plurality of light sources together, can more easily be inserted and removed.

The light sources preferably comprise a plurality of lighting means of the same type. This makes it possible to produce a light with defined characteristics, corresponding to the characteristics of the nature of the lighting means. Furthermore, it is practical to use only one type of lighting means for the plurality of light sources, which is particularly advantageous in terms of the stockholdings of lighting means and their replacement, which occurs regularly in practice.

Until now, professional indoor or outdoor spotlights, in particular, have frequently involved an immense maintenance effort since they are installed in particular at an exposed location and the life of the light sources fitted was generally only between 500 and 3000 hours. The lighting device or high-power light source according to the invention in contrast makes it possible to achieve a light-source life of about 20 000 hours or more.

In principle, different types of light sources or lighting means can be used in the proposed lighting device. A multi-lighting-means lighting unit can thus be provided, which has lighting means such as discharge lamps, incandescent lamps, white LEDs or multichip LEDs, which produce a multiplicity of colors.

In particular, it is advantageous for the light sources to have a plurality of energy-saving lighting means, such as light-emitting diodes. The power consumption of the lighting device can be considerably less than that of other lighting means, as a result of the use of energy-saving lighting means such as light-emitting diodes.

In particular, in a range of applications, such as those mentioned above, the lighting device according to the invention makes it possible to solve the problem of a comparatively large amount of energy, to be precise electrical energy, being required, the majority of which is emitted in the form of heat that is produced when using the lighting device and is not available for the intended purpose of producing the lighting effect. In addition to the disadvantageously increased energy consumption, which does not contribute to the production of light, the major heating leads to considerable other disadvantages and problems, which may also be dependent on the respective application. In the past, attempts have been made, for example, to integrate convection cooling or fan systems, in order to overcome the problem. Without countermeasures, the interior of the spotlights or projectors would suffer from the considerable amount of heat developed because of the light beams, and the relevant lights would fail. The arrangement according to the invention makes it possible to completely or at least very largely dispense with corresponding additional devices and countermeasures.

There is no need for the immense amount of cooling previously required for high-power video projectors, for example, as a result of which no cooling air can enter the interior and also need not be filtered, as a result of which the filters are not required, and no defects can be caused by filter blockages.

For the first time, new application fields can now be covered with corresponding lighting devices without the previously required forced air cooling or other additional measures resulting from the amount of heat developed by the light sources. This is particularly advantageous for outdoor use, because appropriate protecting housings can be provided without any need for the housing openings for fan operation, which are disadvantageous and would have to be hidden or modified.

The lighting device according to the invention may make it possible to completely avoid the need, for example, to use fans, infrared filters or some additional measure, since the light beam or the beam from the light source does not become particularly hot. In particular, this advantageously makes it possible to provide a high-power light source. The light sources which are used are preferably positioned, for example, close to the outside, or for example with a good thermally conductive connection to an outer face of the housing of the lighting device. This results in a large external area for heat dissipation or cooling, for example convection cooling, of the light sources themselves, and the adjacent components.

Furthermore, the lack of air cooling makes it possible to prevent dirt from being introduced into the appliances via the cooling air. The light beam from low-power light sources results in a "cold" beam, thus allowing different materials to be used than those used in the past. In particular, there is no need to use materials which are resistant to high temperature, thus making the proposed arrangement more economic.

In addition, it is now possible to reduce virtually to zero the previously noticeably high amount of noise developed by air-cooled film, television and theater lights and video projectors.

Until now, a multiplicity of lighting devices and spotlights have been used which make use of discharge lamps as light sources. These discharge lights require a certain starting time, however, before they have reached their full brightness. Furthermore, after use, these must first of all be cooled down sufficiently that they can be started again, which may be problematic.

It is likewise possible to avoid changes to the color temperature, as have been routine until now in the case of lamps operated with discharge lamps. This is because the lighting device or high-power light source according to the invention can be kept at a constant color temperature by automatic measurement and readjustment.

When alternative light sources are used and discharge lamps are dispensed with, it is possible to avoid the high starting voltages required for them.

In particular, the use of LED light sources, for example high-power light-emitting diode light sources, in the lighting device according to the invention makes it possible to start the corresponding arrangements immediately and at any time, and the full light power can be called up immediately. Furthermore, the light can be designed to be 100% dimmable. The LED light sources can also advantageously be used for stroboscopic operation.

It is also possible to fit high-power light sources with LEDs with different characteristics. In particular, theater spotlights can advantageously be provided, with a light cover of 3 000 degrees Kelvin, or film spotlights with a light color of 6 000 degrees Kelvin or more.

It is also advantageous to provide an additional device for influencing the light reflected into the main emission direction. The light beam effect of the lighting device can thus be modified and possibly adjusted, depending on the requirements for the lighting device. Inter alia, these may be, for example, color change devices or beam influencing devices, such as iris, shutter or zoom.

The additional device preferably comprises an optical element.

It is also proposed that the additional device comprise an imaging device.

If the aim 1s to allow the color of the lighting device to be changed, this could be done, for example, by using multicolor LEDs, LED arrays or by positioning a color change system in front of a white high-power light source.

The projection of patterns, images, videos, etc. can also advantageously be implemented, since the proposed lighting device or high-power light source produces a sharp beam, and optimum preconditions for illumination of elements and/or materials which are present on or in the spotlight can be created, because of the negligible heat in the beam. These include, for example, liquid crystal displays, digital light processing panels (DLP panels), films or slide films, or plug-in masks or so-called gobos (graphical optical blackout).

Furthermore, various power classes can be implemented without any problems because the lighting device can be equipped in a variable form, in particular depending on the number and/or the power of the light sources such as LEDs.

It is also proposed that the second reflection section have a depression in which further light sources and a third and a fourth reflection section are provided which are designed in the same way as the first and second reflection sections, in order to reflect light from the further light sources into the main emission direction. This allows a second arrangement of the same type as the first to be superimposed in a larger form in a very confined space, as a result of which the additional light sources, in particular, make it possible to further increase the power intensity of the lighting device.

In one advantageous modification of the subject matter according to the invention, the second reflection section is in the form of a solid body with at least one boundary surface, for example in the form of a geometric body, in the form of a prism, composed of glass or plastic.

Finally, it is advantageous for the lighting device to be designed such that the external dimensions of the lighting device are between about 40 mm and a plurality of meters.

In one advantageous modification of the subject matter according to the invention, a deflection-reflection section is provided, which guides light from the light sources onto the raised second reflection section. This allows the light sources to be designed in a variable form, in terms of their fitment positions and/or spatial alignment. The light from the light sources accordingly first of all strikes the deflection-reflection section, and is thrown from there onto the raised second reflection section. The light from the light sources can always be guided in the desired manner onto the second reflection section, depending on the nature of the deflection-reflection section. The deflection-reflection section may be connected to an open face or to an edge, facing the light sources, of the first reflection section. In particular, the deflection-reflection section may in the form of an area which is wider than the funnel of the first reflection section. The deflection-reflection section may be in the form of a separate section, or may be formed integrally with the first reflection section.

It is also advantageous to provide an opposing reflection section, on or by means of which light coming from the first reflection section is reflected. A beam direction of the light can thus be deflected, in particular into a central area of the reflection arrangement or toward the optical axis. A light beam can be reflected on the opposing reflection layer through more than, for example, 130 angular degrees.

In one arrangement, in which the emission direction of the light beam from the light sources runs in the direction of the main emission direction of the lighting device, the opposing reflection section can be used as the last reflective component in the reflection arrangement, with light coming from the first reflection section being reflected by the opposing reflection section into the main emission direction of the lighting device. A corresponding opening, for example a central opening, can be provided in the area of the internal second reflection section, for emergence of the light from the light spot formed in this way. The boundary thereof can additionally contribute to ensuring that the light spot that is formed has a sharp boundary.

It is particularly preferable for the opposing reflection section and a collecting reflection section to be provided such that the light coming from the first reflection section strikes the opposing reflection section and is thrown back from there onto the collecting reflection section, and is deflected by the latter into the main emission direction. A divergent component from the light beam that is produced can in this way be virtually completely prevented, in the main emission direction.

The opposing reflection section and the collecting reflection section may in particular be positioned concentrically with respect to a central longitudinal axis or optical axis of the lighting device. The collecting reflection section is in this case used to collect the light from the opposing reflection section, and for reflection into the effective main emission direction, which is finally provided with the lighting device and runs in the opposite direction to the emission direction of the light from the light sources. The distance between the opposing reflection section and the collecting reflection section may correspond approximately to the size of the deflection-reflection section in the longitudinal direction of the lighting device.

For arrangements in which the emission direction of a light beam from the light sources runs in the direction of the main emission direction of the lighting device, an opposing reflection section can be provided, which in general is designed differently from an opposing reflection section as used in an arrangement in which the emission direction of a light beam from the light sources runs in the opposite direction to the direction of the main emission direction of the lighting device.

The invention furthermore relates to a reflector unit for a lighting device having a multiplicity of light sources, which is distinguished in that a first reflection section is provided and in that a raised second reflection section is provided, which is internal with respect to the first reflection section and is at least partially surrounded by the first reflection section, with the first and the second reflection sections being matched to one another such that a main light beam can be produced, in that light from the light sources first of all strikes the raised second reflection section and is reflected from there onto the first reflection section and, after renewed reflection, leaves the reflection arrangement in the main emission direction.

DESCRIPTION OF THE FIGURES

Further advantages and features of the invention will be described with reference to one exemplary embodiment of the lighting device according to the invention. In detail:

FIG. 1 shows a perspective view of a high-power light according to the invention, with individual components being omitted, FIG. 2 shows a view of the arrangement shown in FIG. 1, as indicated by the arrow P1 in FIG. 1, FIG. 3 shows a view of the arrangement shown in FIG. 1, as indicated by the arrow P2 in FIG. 1, FIG. 4 shows a further perspective view of the arrangement as shown in FIG. 1, FIG. 5 shows an enlarged detail view as indicated by the bounded area A from FIG. 1, FIG. 6 shows an enlarged detail view as indicated by the bounded area B from FIG. 4, FIG. 7 shows an enlarged side view of the arrangement as shown in FIG. 1, FIGS. 8 and 9 show a variant of the reflection arrangement of the high-power light according to the invention, in the form of a schematic partial view from the side, in the form of a section and in perspective, FIGS. 10 and 11 show a further reflection arrangement according to the invention, in the views as shown in FIG. 8 and FIG. 9, and FIGS. 12 and 13 show a further reflection arrangement of a high-power light according to the invention, with a main emission direction in the direction of the emission direction of a light beam from the light sources, in the same views as those shown in FIG. 8 and FIG. 9.

In some cases, the same reference symbols have been chosen for corresponding parts of different exemplary embodiments in the figures.

The figures show exemplary embodiments of a lighting device according to the invention, which is in the form of a high-power light 1 and is illustrated in a highly schematic form, with components of the lighting device having been omitted in order to better illustrate the basic design of the lighting device.

The high-power light 1 comprises an outer reflector 2, a heat sink 3, light sources 4, a conical inner reflector 5 and optical elements 6, 7 and 8.

In this case, the light sources 4 are in the form of light-emitting diodes, or LEDs. FIG. 7 shows one possible and idealized profile of a single light beam 9, comprising the sections 9*a* to 9*e*, and shows in particular light source 4*a*. The light source 4*a* is identical to the other light sources 4, and is aligned in the same way as, and at the same distance from, a reflection arrangement which comprises the outer reflector 2 and the inner reflector 5. Coming from the light source 4*a*, the light beam 9 first of all strikes the conical inner reflector 5, which makes up the first section 9*a* of the light beam 9. The light beam 9 is reflected on the inner reflector 5, as a result of which it strikes the outer reflector 2 on the inside, as indicated by the section 9*b*. As the section 9*c* shows, the light beam 9 is likewise reflected by the outer reflector 2, as a result of which the light beam 9 is thrown back in a main emission direction and is passed in the exterior through an outlet opening 10, which is surrounded in an annular shape by the heat sink 3 and the light sources 4. The direction of the light beam 9 is then changed somewhat by means of the optical elements 6 and 7, in this case being widened slightly outward, as indicated by the further section 9*d*. The light beam 9 then strikes the further optics or the optical element 8, thus resulting in the beam 9, leaving the high-power light 1, as indicated by the section 9*e*.

The total of 24 light-emitting diodes 4 shown by way of example here each form a light beam which is emitted and corresponds to the light beam 9, thus resulting in a superimposition, or a correspondingly reinforced light beam, in the section 9*e* and in front of the optical element 8. Each LED forms a multiplicity of parallel light beams thus making it possible, overall, to achieve a very high light power by means of the light beam that is produced, to be precise by the beam with the edge being formed sharply.

In contrast to the arrangements shown in FIG. 1 to FIG. 7, the deflection-reflection section 11 is provided in each of the FIGS. 8 to 13. The further parts of the high-power light 1 which are illustrated comprise an outer reflector 2 and a conical inner reflector 5. Parts which are likewise provided, such as a heat sink 3 with an outlet opening 10 and a plurality of light sources 4, and possibly existing optics and/or light guide components, are not shown in FIGS. 8 to 13.

The deflection-reflection section 11 is in each case in the form of a conically widening section, in the form of an annular strip, in the direction of the heat sink, which is not illustrated. The inner surface of the deflection-reflection section 11 is designed to be reflective. The deflection-reflection section 11 can be connected, with or without a narrow gap, by its outer edge and with a flat bend inward, to the widened edge of the outer reflector 2. In addition, FIGS. 8, 10 and 12 each show a profile, chosen by way of example, of a light beam 15, which is subdivided into various light beam sections 15a to 15c and further light beam sections 15d to 15j.

The light coming from the light sources is accordingly first of all reflected, as indicated by the light beam section 15a, on the deflection-reflection section 11 inward, as indicated by 15b, to the raised reflector or inner reflector 5, and is emitted from there, as indicated by 15c, to the outer reflector 2 and from there, as is indicated by the light beam section 15d in FIG. 8. This sequence of deflections and reflections of the light is used in all the arrangements shown in FIGS. 8 to 13, in which case the respective specific beam paths may run in spatially different manners. According to FIG. 8, the light beam is emitted from the outer reflector 2, as indicated by the light emission section 15d, in the form of a bundle or in focused form.

As shown in FIGS. 10, 11 and in contrast to the arrangement shown in FIGS. 8, 9, an opposing reflection section 12, which is annular and conical and is provided with a central opening 12a, is positioned between the light sources, which are not illustrated, and the deflection-reflection section 11. As indicated by the light beam section 15a, light coming from the outer reflector 2 is once again reflected by the opposing reflection section 12, as indicated by the light beam section 15f, and is thrown onto a collecting reflection section 13, which is also provided. The funnel-shaped collecting reflection section 13 is positioned at the front open end of the inner reflector 5, and its funnel tip projects slightly into the inner reflector 5. For this purpose, the inner reflector 5 has no tip, or is in the form of a truncated cone, in comparison to the pointed funnel shape of the inner reflector 5 shown in FIGS. 8, 9. Light reflected by the collecting reflection section 13 leaves the reflection arrangement through the opening 12a as indicated by the light beam section 15g, as a result of which a non-divergent focused light beam leaves the reflection arrangement or the high-power light 1, whose light beams are aligned at least virtually parallel to a longitudinal axis S (FIG. 12) of the high-power light 1.

FIG. 12 and FIG. 13 show a further design modification based on the arrangement shown in FIGS. 10 and 11. However, in this case, a main emission direction is provided in the direction of the emission direction of the light beams from the light sources. In this case, a funnel-shaped opposing reflection section 14 is provided, which is concentric with respect to a longitudinal axis S of the high-power light 1, reflects light coming from the outer reflector 2 as indicated by the light beam section 15h, and reflects it outward via an opening 5a in the inner reflector 5, which is open at the front, as indicated by the light beam section 15j. The emitted focused or combined light beam leaves the high-power light 1 parallel to the longitudinal axis S.

An optical beam guidance or focusing element can be provided in order to further influence the light effect of the high-power light 1. This can, for example, be a slim or elongated cylindrical body composed of material which conducts light, by means of which it is possible, for example, to greatly reduce the widening of widening light cone, for example a light cone with a light cone angle from about 130 angular degrees to about 10 angular degrees. This allows a sharply bounded bright image spot to be produced.

List of Reference Symbols
1 High-powered light
2 Outer reflector
3 Heat sink
4 Light source
4a Light source
5 Internal reflector
5a Opening
6 Optical element
7 Optical element
8 Optical element
9 Light beam
9a to 9e Light beam section
10 Outlet opening
11 Deflection reflection section
12 Opposing reflection section
12a Opening
13 Collecting reflection section
14 Opposing reflection section
15 Light beam
15a to 15j Light beam section

What is claimed is:

1. In a lighting device (1) having a plurality of light sources (4) and a reflection arrangement, with the light sources (4) being positioned in front of a reflection surface of the reflection arrangement wherein the improvement comprises the plurality of light sources (4) arranged around an outlet opening (10) in the plurality of light sources, said plurality of light sources facing an opposing concave conical reflection section (2) having a raised convex conical reflection section (5) disposed internal with respect to the concave conical reflection section (2) and at least partially surrounded by the concave reflection section (2), with the concave conical and convex conical reflection sections being matched to one another and opposed to the plurality of light sources such that a main light beam emission is produced whereby light from the plurality of light sources (4) first strikes the raised convex conical reflection section (5) and is reflected from there onto the concave conical reflection section (2) and leaves the reflection arrangement in the a main emission direction through the outlet opening (10) in the plurality of light sources.

2. In a lighting device having a plurality of light sources and a reflection arrangement, with the light sources being positioned in front of a reflection surface of the reflection arrangement wherein the improvement comprises a light having an emission direction of a light beam in the same direction or in an opposite direction from the plurality of light sources wherein the reflection arrangement has a concave conical reflection section (2, 11) having a raised convex conical reflection section (5) disposed internal with respect to the concave conical reflection section (2) and at least partially surrounded by the concave conical reflection section (2), with the concave conical and convex conical reflection sections being matched to one another such that a main light beam is produced in which light from the plurality of light sources first strikes the concave conical reflection section (2, 11) and then the raised convex conical reflection section (5) and after reflection from the raised convex conical reflection section is emitted in the main emission direction of the lighting device.

3. The lighting device as claimed in claim 2 wherein light coming from the convex conical reflection section (5) leaves the reflection arrangement in the main emission direction after a further reflection from the convex conical reflection section or the concave conical reflection section (2).

4. The lighting device as claimed in claim 1 or 2 wherein the light sources (4) comprise a plurality of lighting means of the same type.

5. The lighting device as claimed in claim 1 or 2 wherein the light sources (4) comprise a plurality of energy-saving lighting means or light-emitting diodes.

6. The lighting device as claimed in claim 1 wherein an additional optical device (6, 7, 8) is provided to influence the light reflected into the main emission direction.

7. The lighting device as claimed in claim 1 further comprising an additional optical device.

8. The lighting device as claimed in claim 1 or 2 further comprising an imaging device.

9. The lighting device as claimed in claim 2 wherein the convex conical reflection section has an outlet and further comprising a further reflection section (14) which is designed in the same way as the concave conical reflection section in order to reflect light from the plurality of light sources into the main emission direction.

10. The lighting device as claimed in claim 2 wherein the concave conical reflection section is a solid body with at least one boundary surface.

11. The lighting device as claimed in claim 1 wherein the external dimensions of the lighting device are between approximately 40 mm and a plurality of meters.

12. The lighting device as claimed in claim 2 wherein the concave conical reflection section (2, 11) is a deflection-reflection section (11) which guides light from the light sources onto the raised convex conical reflection section (5).

13. The lighting device as claimed in claim 2 further comprising an opposing reflection section (12, 14) to reflect the light coming from the concave conical reflection section.

14. In a reflector unit for a lighting device having a multiplicity of light sources (4) wherein the improvement comprises the multiplicity of light sources (4) arranged around a concave shaped ring and a reflection arrangement having at least two reflection sections where at least one reflection section is a raised convex reflection section having a raised conical reflection section which is internal with respect to a concave reflection section and is at least partially surrounded by the concave reflection section, with the at least two reflection sections both in front of and facing the multiplicity of light sources to produce a main light beam from the multiplicity of light sources so that light strikes and is reflected from the at least two reflection sections and leaves the reflection arrangement in a main emission direction through an outlet in the concave shaped ring or through an outlet in the raised conical reflection section.

\* \* \* \* \*